United States Patent
Aliakseyeu et al.

(10) Patent No.: US 11,927,948 B2
(45) Date of Patent: Mar. 12, 2024

(54) PRESENTING A CURRENT STATUS OF A DEVICE IN DEPENDENCE ON A PRIVACY MODE

(71) Applicant: SIGNIFY HOLDING B.V., Eindhoven (NL)

(72) Inventors: Dzmitry Viktorovich Aliakseyeu, Eindhoven (NL); Bartel Marinus Van De Sluis, Eindhoven (NL); Mustafa Tolga Eren, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 163 days.

(21) Appl. No.: 17/762,290

(22) PCT Filed: Sep. 23, 2020

(86) PCT No.: PCT/EP2020/076551
§ 371 (c)(1),
(2) Date: Mar. 21, 2022

(87) PCT Pub. No.: WO2021/058554
PCT Pub. Date: Apr. 1, 2021

(65) Prior Publication Data
US 2022/0390935 A1 Dec. 8, 2022

(30) Foreign Application Priority Data
Sep. 26, 2019 (EP) ...................................... 19199863

(51) Int. Cl.
*G05B 23/02* (2006.01)
*H04L 67/54* (2022.01)

(52) U.S. Cl.
CPC .......... *G05B 23/0272* (2013.01); *H04L 67/54* (2022.05)

(58) Field of Classification Search
CPC .... G05B 23/0272; H04L 67/54; H05B 47/105
See application file for complete search history.

(56) References Cited

U.S. PATENT DOCUMENTS

| | | |
|---|---|---|
| 2009/0077055 A1 | 3/2009 | Dillon et al. |
| 2015/0120000 A1 | 4/2015 | Coffey et al. |
| 2015/0154404 A1 | 6/2015 | Patel et al. |
| 2015/0254463 A1* | 9/2015 | Ryhorchuk ........... H04L 9/3247 713/176 |
| 2019/0069132 A1 | 2/2019 | Pandharipande et al. |
| 2020/0196141 A1* | 6/2020 | Baker ................... H04W 12/02 |

FOREIGN PATENT DOCUMENTS

| | | |
|---|---|---|
| EP | 2856845 B1 | 8/2017 |
| WO | 2013068920 A2 | 5/2013 |
| WO | 2016088006 A1 | 6/2016 |
| WO | 2018224431 A1 | 12/2018 |

\* cited by examiner

*Primary Examiner* — Mohamed Barakat
*Assistant Examiner* — Sharmin Akhter (57) ABSTRACT

A system (1) is configured to receive status information reflecting a current status of a device (33) and determine first status information (68,69) for presentation on a first user device (1). The first status information reflects the current status of the device. The system is further configured to cause the first status information to be presented on the first user device and cause second status information (78,79) to be presented on a second user device. The second status information reflects the current status of the device in dependence on whether a privacy mode is active for the device.

14 Claims, 6 Drawing Sheets

PRESENTING A CURRENT STATUS OF A DEVICE IN DEPENDENCE ON A PRIVACY MODE

CROSS-REFERENCE TO PRIOR APPLICATIONS

This application is the U.S. National Phase application under 35 U.S.C. § 371 of International Application No. PCT/EP2020/076551, filed on Sep. 23, 2020, which claims the benefit of European Patent Application No. 19199863.2, filed on Sep. 26, 2019. These applications are hereby incorporated by reference herein.

FIELD OF THE INVENTION

The invention relates to a system for receiving status information reflecting a current status of a device and causing first status information to be presented on a first user device and second status information to be presented on a second user device.

The invention further relates to a method of receiving status information reflecting a current status of a device and causing first status information to be presented on a first user device and second status information to be presented on a second user device.

The invention also relates to a computer program product enabling a computer system to perform such a method.

BACKGROUND OF THE INVENTION

The number of connected 24/7-enabled devices continues to grow. Many of these devices continuously collect the data to support a multitude of services either for user or company benefits. The common services that use data are security, context awareness, personalized recommendations, amongst others.

Connected products such as lighting use real-time and historical data to improve their behavior and offer personalization and smart services to the users. With a growing number of connected devices, the data collected becomes more precise and as a result might lead to undesired privacy related behaviors.

It is known to limit the collection and use of privacy-sensitive data. For example, EP2856845 A2 discloses a method and corresponding system for use in a Networked Lighting Control System whereby an individual can determine various privacy settings for data collected that relates to an area in which he/she is being monitored. These various settings include selecting by the individual what specific types of data can be/cannot be collected; whether he/she can be linked to the collected data; and limiting the purpose for which the data can be used.

A drawback of the method of EP2856845 A2 is that if a user does not want certain data to be shared with others, he can disable logging of this data, but then, he does not have access to this data himself either. This is especially disadvantageous when this data helps the user control a device.

SUMMARY OF THE INVENTION

It is a first object of the invention to provide a system, which allows a user to protect privacy-sensitive device status information in a manner that does not make the user's control of the device inconvenient.

It is a second object of the invention to provide a method, which allows a user to protect privacy-sensitive device status information in a manner that does not make the user's control of the device inconvenient.

In a first aspect of the invention, a system for receiving status information reflecting a current status of a device and causing first status information to be presented on a first user device and second status information to be presented on a second user device comprises at least one input interface, at least one output interface, and at least one processor configured to use said at least one input interface to receive said status information reflecting said current status of said device, determine said first status information for presentation on said first user device, said first status information reflecting said current status of said device, use said at least one output interface to cause said first status information to be presented on said first user device, and use said at least one output interface to cause said second status information to be presented on said second user device, said second status information reflecting said current status of said device in dependence on whether a privacy mode is active for said device.

By causing accurate device status information to be presented on the first user device and causing either accurate or non-accurate device status information, depending on whether a privacy mode is active for the device, to be presented on the second user device, a user can protect privacy-sensitive device status information from others without making his control of the device inconvenient. For example, he may not want others to know that a certain lamp has been switched on, but still want to be able to check himself that this lamp has been switched on. Said device may be a lighting device and said status may comprise at least one of a current on/off setting, a current light output level and a current color setting, for example.

Said at least one processor may be configured to use said at least one output interface to transmit said first status information to said first user device, determine said second status information, and use said at least one output interface to transmit said second status information to said second user device. This is beneficial if the system is comprised in a bridge or Internet server, for example.

Alternatively, said system may be comprised in said first user device and said at least one processor may be configured to transmit a command to a further device, said command commanding said further device to cause said second status information to be presented on said second user device. In this case, it is the first user device that informs the second user device of the relevant status information and decides which status information will be presented on the second user device.

Said at least one processor may be configured to use said at least one input interface to receive a control command for controlling said device and use said at least one output interface to control said device according to said control command in dependence on whether said privacy mode is active for said device. This allows control of the device to be prohibited for users who are not allowed to see the current status of the device when the privacy mode is active for the device.

Said at least one processor may be configured to determine said second status information such that said second status information does not reflect said current status or a fictitious status of said device and indicates that a privacy mode is active for said device upon determining that said privacy mode is active for said device. This avoids causing confusion to the user of the second user device as to what the status of the device is, but this makes it impossible to hide the fact that the privacy mode is active, which is a drawback if this fact is itself privacy-sensitive information.

Said at least one processor may be configured to determine said second status information such that said second status information identifies a user who activated said privacy mode and/or a user device on which said privacy mode was activated. This makes it easier to find out how to disable the privacy mode if desired.

Said at least one processor may be configured to determine a fictitious current status for said device and include said fictitious current status in said second status information upon determining that said privacy mode is active for said device. For example, said fictitious current status may be a last known status of said device before said privacy mode was activated for said device, said fictitious current status may be randomly determined or said fictitious current status may be determined based on a plurality of previous statuses of said device. This allows the fact that the privacy mode is active to be hidden, which is a benefit if this fact is itself privacy-sensitive information.

Said privacy mode may have been activated on said first user device and/or by a user of said first user device. Thus, the user that activates the privacy mode is allowed to see the actual status information.

Said first user device may be connected to the same local network as said device and said second user device may be connected to a different local network than said device. For example, a user that is at home is able to see the actual status information, while another user that was given permission to control devices while visiting this user's home, but who is no longer in this user's home is not able to see the actual status information.

Said first user device may be used by a user identified in first user information associated with said privacy mode and/or said second user device may be used by a user identified in second user information associated with said privacy mode. This makes it possible to identify specific users who should be able to see or specific users who should not be able to see the actual status information when the privacy mode is active.

Said privacy mode may be automatically activated upon selection of a first light scene associated with said privacy mode or upon use of first light control means associated with said privacy mode and/or automatically deactivated upon selection of a second light scene not associated with said privacy mode or upon use of second light control means not associated with said privacy mode. This makes it unnecessary for a user to activate and/or deactivate the privacy mode manually in certain cases. The light scenes may be user selected or automatically selected (e.g. time based, based on a sensor trigger). The first light control means and the second light control means may each comprise, for example, a specific physical interface, e.g. a dimmer switch, or a specific app e.g. HueSync.

Said privacy mode may be automatically activated or deactivated upon detection of the presence of one or more specified persons and/or the absence of one or more specified persons and/or based on a user-specified schedule (e.g. from 20.00 to 0.00). This makes it unnecessary for a user to activate the privacy mode manually in certain cases. For example, two users both have a control app for controlling lighting devices in their home and the first user may be able to specify that the privacy mode is automatically activated when the first user is detected and the second user is not detected. The privacy mode may then be automatically deactivated as soon as the second user is detected.

In a second aspect of the invention, a method of receiving status information reflecting a current status of a device and causing first status information to be presented on a first user device and second status information to be presented on a second user device comprises receiving said status information reflecting said current status of said device, determining said first status information for presentation on said first user device, said first status information reflecting said current status of said device, causing said first status information to be presented on said first user device, and causing said second status information to be presented on said second user device, said second status information reflecting said current status of said device in dependence on whether a privacy mode is active for said device. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for receiving status information reflecting a current status of a device and causing first status information to be presented on a first user device and second status information to be presented on a second user device.

The executable operations comprise receiving said status information reflecting said current status of said device, determining said first status information for presentation on said first user device, said first status information reflecting said current status of said device, causing said first status information to be presented on said first user device, and causing said second status information to be presented on said second user device, said second status information reflecting said current status of said device in dependence on whether a privacy mode is active for said device.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
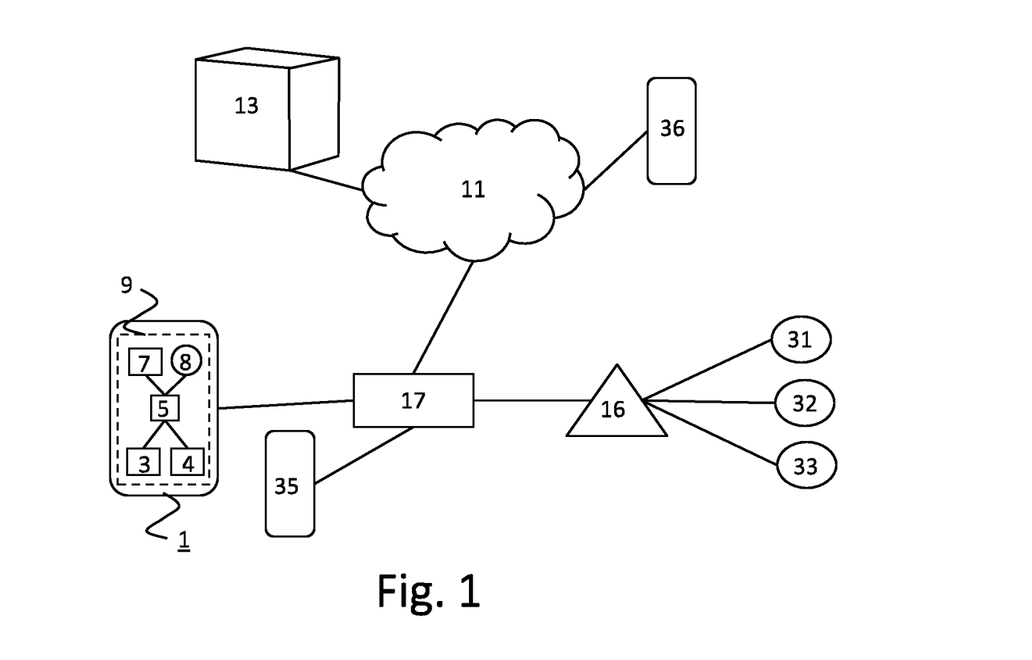
FIG. 1 is a block diagram of a first embodiment of the system.

FIG. 1 shows a first embodiment of the system for receiving status information reflecting a current status of a device and causing first status information to be presented on a first user device and second status information to be presented on a second user device. In this first embodiment, the system is a mobile device 1 and the mobile device 1 is also the first user device. The second user device is a mobile device 35 or 36.

Mobile devices 1, 35 and 36 run an app for controlling lighting devices 31-33, which may be Hue lamps, for example. The lighting devices 31-33 communicate with a (light) bridge 16, e.g. using Zigbee technology. The bridge 16 may be a Philips Hue bridge, for example. The mobile devices 1 and 35 are able to control the lighting devices 31-33 via a wireless LAN access point 17 and the bridge 16. The wireless LAN access point 17 is connected to the Internet 11. An Internet server 13 is also connected to the Internet 11. The mobile device 36 is able to control the lighting devices 31-33 via Internet server 13.

The mobile device 1 comprises a transceiver 3, a transmitter 4, a processor 5, memory 7, and a display 9. The processor 5 is configured to use the receiver 3 to receive the status information reflecting the current status of one of lighting devices 31-33 from the bridge 16 or the Internet server 13 and determine the first status information for presentation on the mobile device 1. The status of lighting devices 31-33 comprises a current on/off setting and/or a current light output level and/or a current color setting, for example. The first status information reflects the current status of the device and may be the same as the status information received the from bridge 16 or the Internet server 13, for example.

The processor 5 is further configured to use the display 9 to cause the first status information to be presented on the mobile device 1 and use the transmitter 4 to cause the second status information to be presented on the mobile device 35 or 36. The second status information reflects the current status of the device in dependence on whether a privacy mode is active for the device.

In the embodiment of FIG. 1, the processor 5 is configured to use the transmitter 4 to transmit a command commanding a further device to cause the second status information to be presented on the second user device. The command may be transmitted to the mobile device 35 or 36, the bridge 16 or the Internet server 13, for example.

Information on whether a privacy mode is active for a lighting device or for all lighting devices may be obtained from the bridge 16 or the Internet server 13, for example. There are several possible reasons why the user of the mobile device 1 is allowed to see the actual status information and the user of the mobile device 35 or 36 is not, e.g.:
- the privacy mode was activated on the mobile device 1 and/or by a user of the mobile device 1;
- the mobile device 1 is connected to the same local network as the device (which is one of lighting devices 31-33) and the mobile device 36 is connected to a different local network than the device;
- The mobile device 1 is used by a user identified in first user information (e.g. a first list of user identifiers) associated with the privacy mode and/or the mobile device 35 or 36 is used by a user identified in second user information (e.g. a second list of user identifiers) associated with the privacy mode.

When the privacy mode is active, one or more of the following restrictions may additionally be applied:
- collected data is not shared with other smart home systems;
- local processing of data is used whenever possible (e.g. for presence detection); collected data is either not stored, or only temporally stored with a limited buffer size, or stored with a lower sampling rate;
- collected data is only processed for real-time behavior and is not used for any learning algorithms.

When the privacy mode is active, not only may the current state of one or more devices not be shown on certain user devices, the currently active light scene, last user actions and/or the presence sensor state might also not be shown on these certain user devices. However, when presence is detected, the system would typically still behave in the same way, e.g. switch on the lights. When the system does not share states of devices and possibly data collected by these devices with any other smart home systems such as Amazon Echo or Google Home in privacy mode, it may still allow the devices to be controlled using these other smart home systems.

The activation of the privacy mode may be triggered by the activation of a specific light scene (e.g. a relax scene) or routine (e.g. a fall asleep routine). During the time that this light scene or routine is active, the events detected by associated connected devices (e.g. devices in the room or area in which the relax scene generates its effect) may be processed according to the restrictions of the privacy mode.

A selective privacy mode may be implemented where the privacy mode is only activated in a specific room (e.g. bedroom), i.e. for the devices in that room, and not in the whole house. The privacy mode may be automatically deactivated if a user changes the scene, at the end of a routine, or due to timeout. The privacy mode could also be automatically deactivated when a user is detected to have left his home.

Two different levels of privacy could be implemented:
1. Explicit. In explicit mode, the system does not hide that it is in privacy mode (e.g. indicates that no device status information is available). This allows third-party integrations to adapt their functionality accordingly.
2. Transparent. In transparent mode, the system mimics default system behavior (e.g. shows believable, but fictious device states) so that the privacy mode cannot be detected by third party integrations or remote observers.

An implementor may choose one of these privacy levels or may implement both privacy levels and allow a user or administrator to select the level of privacy he wishes to use.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-33 are controlled by the mobile devices 1 and 35 via the bridge 16. In an alternative embodiment, one or more of the lighting devices 31-33 are controlled by one or more of the mobile devices 1 and 35 without a bridge, e.g. directly via Bluetooth. In the embodiment of FIG. 1, the Internet server 13 receives data from and transmits data to the lighting devices 31-33 via the bridge 16. In an alternative embodiment, the Internet server 13 receives data from and transmits data to one or more of the lighting devices 31-33 without a bridge.

Figure 2:
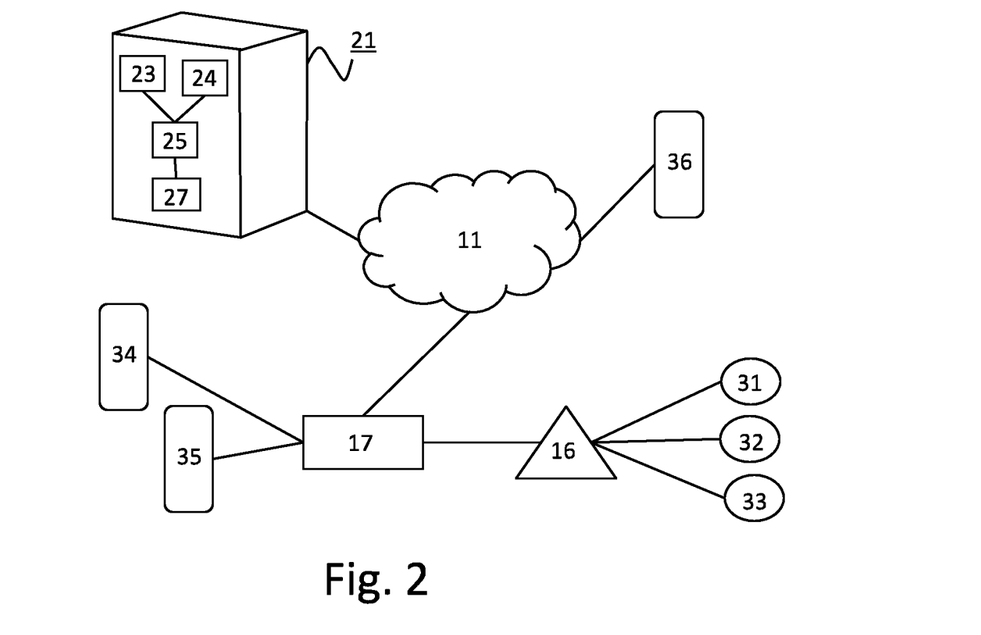
FIG. 2 is a block diagram of a second embodiment of the system.

FIG. 2 shows a first embodiment of the system for receiving status information reflecting a current status of a device and causing first status information to be presented on a first user device and second status information to be presented on a second user device. In this second embodiment, the system is a computer 21, the first user device is a mobile device 34 and the second user device is a mobile device 35 or 36. The computer 21 is connected to the Internet 11 and acts as a server. The mobile devices 34-36 are able to control the lighting devices 31-33 via computer 21.

The computer 21 comprises a receiver 23, a transmitter 24, a processor 25, and storage means 27. The processor 25 is configured to use the receiver 24 to receive the status information reflecting the current status of one of lighting devices 31-33 from the bridge 16 and determine the first status information for presentation on the mobile device 34. The first status information reflects the current status of the device and may be the same as the status information received the from bridge 16, for example.

The processor 25 is further configured to use the transmitter 24 to cause the first status information to be presented on the mobile device 34 and cause the second status information to be presented on the mobile device 35 or 36. The second status information reflects the current status of the device in dependence on whether a privacy mode is active for the device.

In the embodiment of FIG. 2, the processor 25 is configured to use the transmitter 24 to transmit the first status information to the mobile device 34, e.g. on request of the mobile device 34, determine the second status information, and use the transmitter 24 to transmit the second status information to the mobile device 35 or 36, e.g. on request of the mobile device 35 or 36.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g. from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiment of FIG. 2, the computer 21 receives data from and transmits data to the lighting devices 31-33 via the bridge 16. In an alternative embodiment, the computer 21 receives data from and transmits data to one or more of the lighting devices 31-33 without a bridge.

Figure 3:
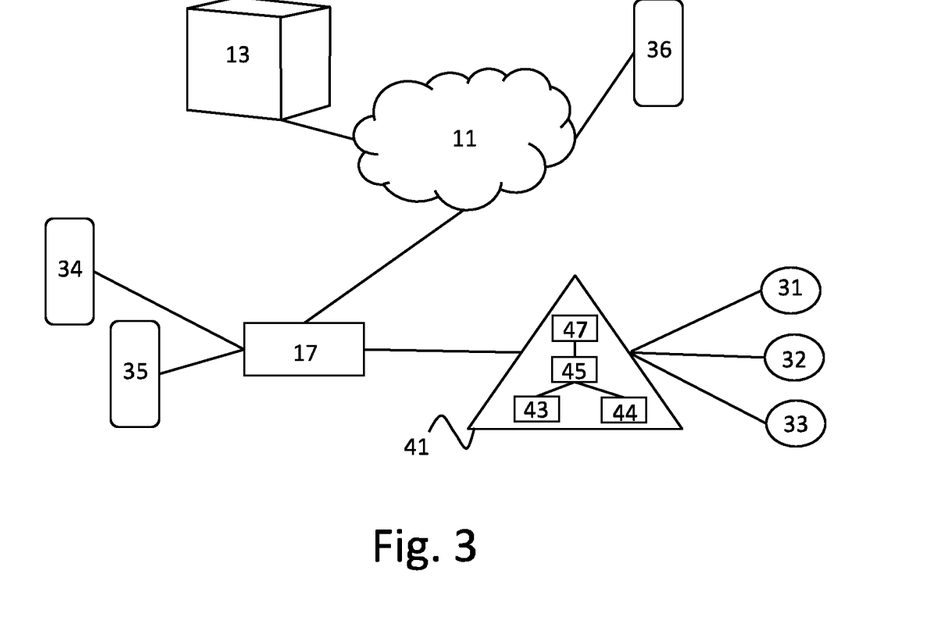
FIG. 3 is a block diagram of a third embodiment of the system.

FIG. 3 shows a first embodiment of the system for receiving status information reflecting a current status of a device and causing first status information to be presented on a first user device and second status information to be presented on a second user device. In this third embodiment, the system is a bridge 41, the first user device is a mobile device 34 and the second user device is a mobile device 35 or 36. The mobile devices 34 and 35 are able to control the lighting devices 31-33 via the wireless LAN access point 17 and the bridge 16. The mobile device 36 is able to control the lighting devices 31-33 via Internet server 13.

The bridge 41 comprises a receiver 43, a transmitter 44, a processor 45, and a memory 47. The processor 45 is configured to use the receiver 43 to receive the status information reflecting the current status of one of the lighting devices 31-33 from the device itself (i.e. one of the lighting devices 31-33) and determine the first status information for presentation on the mobile device 34. The status information reflects the current status of the device and may be the same as the status information received the from device, for example.

The processor 45 is configured to use the transmitter to cause the first status information to be presented on the mobile device 34 and cause the second status information to be presented on the mobile device 35 and 36. The second status information reflects the current status of the device in dependence on whether a privacy mode is active for the device.

In the embodiment of FIG. 3, the processor 45 is configured to use the transmitter 44 transmit the first status information to the mobile device 34, determine the second status information, and use transmitter 44 to transmit the second status information to the mobile device 35 or 36.

In the embodiment of the bridge 41 shown in FIG. 3, the bridge 41 comprises one processor 45. In an alternative embodiment, the bridge 41 comprises multiple processors. The processor 45 of the bridge 41 may be a general-purpose processor, e.g. ARM-based, or an application-specific processor. The processor 45 of the bridge 41 may run a Unix-based operating system for example. The memory 47 may comprise one or more memory units. The memory 47 may comprise solid-state memory, for example. The memory 47 may be used to store a table of connected lights, for example.

The receiver 43 and the transmitter 44 may use one or more wired or wireless communication technologies, e.g. Ethernet for communicating with the wireless LAN access point 17 and Zigbee for communicating with the lighting devices 31-33, for example. In an alternative embodiment, multiple receivers and/or multiple transmitters are used instead of a single receiver and a single transmitter. In the embodiment shown in FIG. 3, a separate receiver and a separate transmitter are used. In an alternative embodiment, the receiver 43 and the transmitter 44 are combined into a transceiver. The bridge 41 may comprise other components typical for a network device such as a power connector. The invention may be implemented using a computer program running on one or more processors.

In the embodiments of FIGS. 1-3, the system of the invention comprises a mobile device, a computer or a bridge. In an alternative embodiment, the system of the invention is a different device. In the embodiments of FIGS. 1-3, the system of the invention comprises a single device. In an alternative embodiment, the system of the invention comprises a plurality of devices. Although the user devices are mobile devices in the examples of FIGS. 1-3, other types of devices may be used as user devices.

To enable privacy mode, the system is able to switch between a privacy mode and a normal mode, i.e. a mode in which the privacy mode is not active. The privacy mode can be set for all devices in a home or for a subset of devices in the home (e.g. all devices in a certain room or a single device), for example. The devices may be lighting devices, for example.

In the privacy mode a set of restrictions on system operation is applied. These restrictions could be defined by the user or by the system. Typically, the operation of the system will include the following steps—(1) setting up and configuring; (2) activation of the privacy mode; (3) maintaining privacy mode with set restrictions; (4) switching back to the normal mode of operation. Steps 2 and 4 will be explained with the help of FIGS. 9 and 10. Step 3 will be explained with the help of FIGS. 4, 5 and 7.

Figure 4:
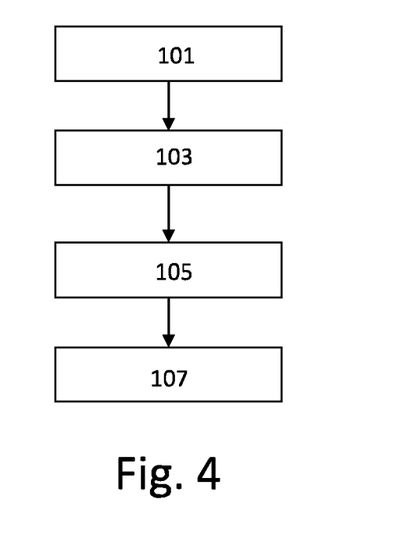
FIG. 4 is a flow diagram of a first embodiment of the method.

A first embodiment of the method of receiving status information reflecting a current status of a device and causing first status information to be presented on a first user device and second status information to be presented on a second user device is shown in FIG. 4. A step 101 comprises receiving the status information reflecting the current status of the device.

A step 103 comprises determining the first status information for presentation on the first user device. The first status information reflects the current status of the device and may be the same as the status information received in step 101. A step 105 comprises causing the first status information to be presented on the first user device. A step 107 comprises causing the second status information to be presented on the second user device. The second status information reflects the current status of the device in dependence on whether a privacy mode is active for the device.

In addition to restricting the sharing of status information by preventing the current status of a device to be displayed on certain user devices in the privacy mode, one or more additional restrictions may be applied while maintaining the privacy mode:

Data collection restrictions: data is not collected at all or only for real time processing maintaining or only a limited buffer e.g. of 5 minutes or only for the purpose of learning and not for real-time behavior (the latter mode could be used when collected data is only used to train the system and is not stored in its original form; only aggregated data is stored).

Data processing: data is not processed in any way (data is not collected) or data is processed only for real time behavior (e.g. presence detection) and is not stored or used for learning or data is used but processed locally, i.e. not sent to a remote server/cloud, or data is processed as a part of a learning mechanism but not stored in its original form.

Restrict visualizing detected event details even if sensor events and its properties are sent to other devices, the sent data may be labelled or classified as privacy-sensitive information, and based on this classification the receiving devices will not report the event details in an app, dashboard, portal or any other user applications.

Figure 5:
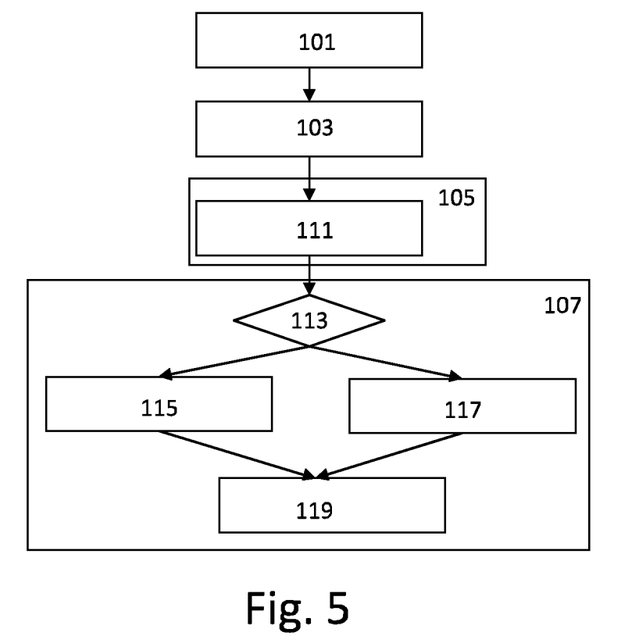
FIG. 5 is a flow diagram of a second embodiment of the method.

A second embodiment of the method of receiving status information reflecting a current status of a device and causing status information to be presented on user devices is shown in FIG. 5. In the embodiment of FIG. 5, step 105 of FIG. 4 comprises a sub step 111 and step 107 of FIG. 5 comprises sub steps 113-119.

In the embodiment of FIG. 5, the method is performed by the first device. In step 111, the first status information (determined in step 103) is presented on a display of the first device. The first sub step of step 107, i.e. step 113, comprises checking whether a privacy mode is active for the device whose status information was received in step 101. If not, then step 117 is performed. Step 117 comprises determining second status information that is the same as the first status information determined in step 103.

If the privacy mode is active, step 115 is performed. Step 115 comprises determining the second status information such that the second status information does not reflect the current status or a fictitious status of the device and indicates that a privacy mode is active for the device upon determining that the privacy mode is active for the device. In the embodiment of FIG. 5, step 115 also comprises determining the second status information such that the second status information identifies a user who activated the privacy mode and/or a user device on which the privacy mode was activated. Step 119 comprises transmitting the second status information to the second user device.

Figure 6:
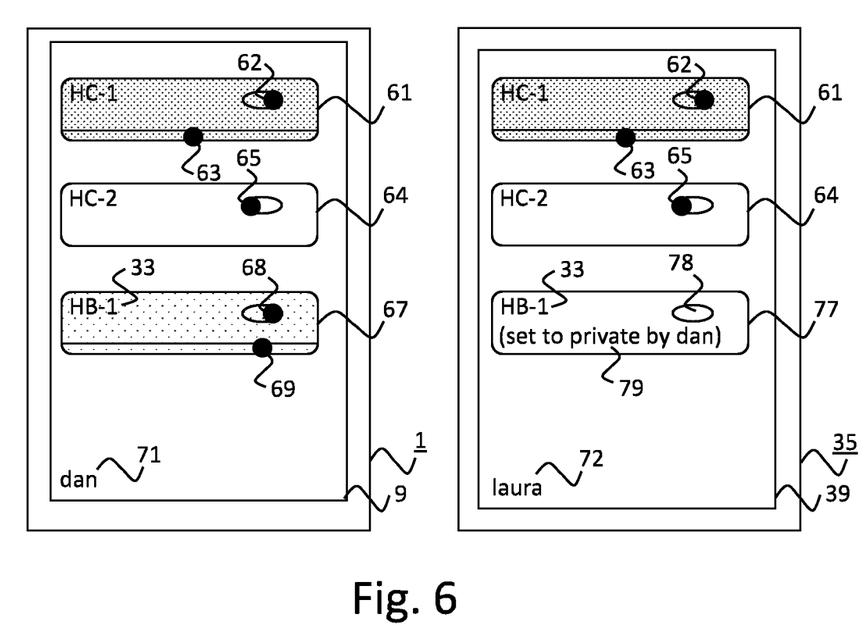
FIG. 6 shows a first example of a user interface shown on first and second user devices.

FIG. 6 shows a first example of a user interface shown on first and second user devices. The first user device 1 is used by a user named "Dan". The name of the user is identified by label 71 on display 9 of the first user device 1. The second user device 35 is used by a user name "Laura". The name of the user is identified by label 72 on display 39 of the second user device 35.

Both user devices show a user interface for controlling lighting devices 31-33 of FIG. 1. Panel 61 reflects the current status of lighting device 31 and can be used to control the lighting device 31. Panel 64 reflects the current status of lighting device 32 and can be used to control the lighting device 32. Panel 67 reflects the current status of lighting device 33 and can be used to control lighting device 33.

Each panel shows a name of the corresponding lighting device. For example, panels 67 and 77 show the name of lighting device 33. Furthermore, each panel has a color that corresponds to the color rendered by the corresponding lighting device. Each panel also shows a dim level with the help of a circle rendered on top of a bar, e.g. circles 63 and 69, and shows whether the corresponding light is on or off with a switch, e.g. switches 62, 65 and 68. If a switch is off, as is the case in panel 64, then the panel is not colored and the bar and circle representing the dim level are not shown.

Panel 77 is shown when the privacy mode is active for the lighting device 33. The status information displayed in panel 77 has been determined in step 115 of FIG. 5. Status information for lighting device 33 is also shown in panel 77, but the actual status is not shown to Laura due to the privacy mode being active. Instead, the message 79 comprising the text "set to private by dan" is shown. In the example of FIG. 6, the panel 77 shows who has activated the privacy mode (the user named "Dan") and control of the lighting device 33 is disabled when the privacy mode is active for the lighting device 33, i.e. an empty oval 78 is shown instead of a switch.

Figure 7:
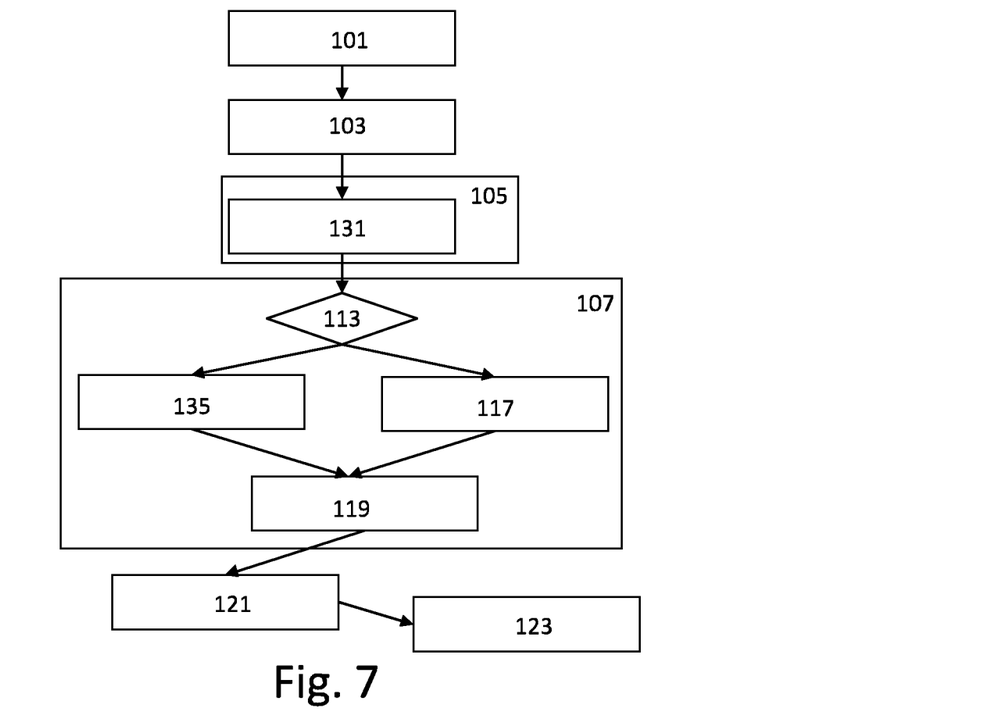
FIG. 7 is a flow diagram of a third embodiment of the method.

A third embodiment of the method of receiving status information reflecting a current status of a device and causing status information to be presented on user devices is shown in FIG. 7. In the embodiment of FIG. 7, step 105 comprises a sub step 131 instead of sub step 111 of FIG. 5, step 115 of FIG. 5 is replaced with a step 135 and steps 121 and 123 are performed after step 107.

In the embodiment of FIG. 7, the method is performed by a device other than the first device, e.g. a bridge or an Internet server. In step 131, the first status information (determined in step 103) is transmitted to the first user device. After it has been determined in step 113 that a privacy mode is active for the device whose status information was received in step 101, step 135 is performed.

Step 135 comprises determining the second status information by determining a fictitious current status for the device and include the fictitious current status in the second status information upon determining that the privacy mode is active for the device. The fictitious current status may be a last known status of the device before the privacy mode was activated for the device, the fictitious current status may be randomly determined or the fictitious current status may be determined based on a plurality of previous statuses of the device, for example.

Step 121 comprises receiving a control command for controlling the device from the second user device. Step 123 comprises controlling the device according to the control command in dependence on whether the privacy mode is active for the device. If the user of the second user device is located near the device, the user would learn that the privacy mode is active for the device if it does not respond to his commands. On the other hand, the user of the second user device would likely know the actual current status of the device anyway if he is located near the device, and therefore also know that the privacy mode is active for this device.

The second status information may be updated to reflect the content of the control command in step 121. In this case, if the user of the second user device is located remotely, he may get the impression that he indeed was able to control the device. This is not shown in FIG. 7.

Figure 8:
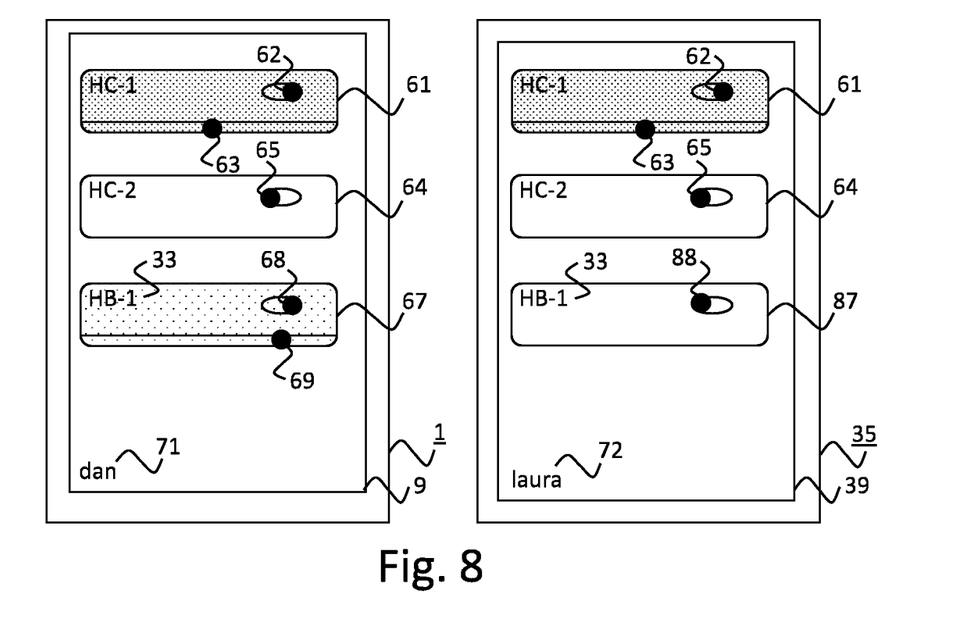
FIG. 8 shows a second example of a user interface shown on first and second user devices.

FIG. 8 shows a second example of a user interface shown on first and second user devices. In the example of FIG. 8, a panel 87 is shown on display 39 of the second user device 35 instead of the panel 77 of FIG. 6. The status information displayed in panel 87 has been determined in step 135 of FIG. 7 and includes a fictitious current status. Switch 88 shown in panel 87 indicates that the lighting device 33 is turned off, while lighting device 33 is in fact turned on, as shown in panel 67 displayed on the first user device 1.

Before the privacy mode is maintained, the privacy mode is typically setup and configured. In a simple embodiment, the privacy mode is defined by the system itself, such that the user does not have any control on what and how restrictions are enabled. In another embodiment, the user could define if the whole (lighting) system or only part of it should be restricted when privacy mode is activated and how restrictive the mode should be. Moreover, the user could also define how the mode is activated, including auto activation if certain conditions are met. Moreover, the user could define visibility of the (lighting) system based on user access level including informing the user if the system is in the privacy mode.

The privacy mode is maintained as soon as it has been activated. The privacy mode could be manually enabled by the user. Alternatively, the user/system might define a set of rules when the privacy mode is enabled. These rules could include—routines and schedules (e.g. activate the privacy mode on weekends, or on a specific day defined in the schedule), associated with the state of the system (e.g. if a specific scene in the hue lights is active privacy mode is also activated), associated with the presence of a specific device or a person (e.g. if person A is detected the system automatically switches to a privacy mode), the presence based activation could also include a combination of users and devices including unknown devices and unknown people (e.g. if person A and B detected activate the privacy mode, while if A, B, and C person detected do not activate it).

In a more advanced system, the user may delegate the activation to the system, by indicating that the system should switch to private mode upon detecting events that according to the system have a high likelihood of being privacy-sensitive, e.g. the use of specific light control means or activation of a specific system state like a streaming state. The system may also have learned from previous activations of the privacy mode by the user himself, and (suggest to) activate the private mode upon detecting similar circumstances.

Similar to activation switching back to normal mode may either be manual or can be based on predefined rules. The system could switch back to normal mode if conditions for a privacy mode are not met anymore, if a timeout (timer expiry) happens (e.g. the privacy mode could only be activated for a certain time span and then need to be reactivated again), or if certain conditions are met that overrule the privacy mode (e.g. unknown person detected the privacy mode is immediately switched off), for example. If (soft) security applications are active (e.g. hue out of home), de-activation of a private mode might require user authentication.

Figure 9:
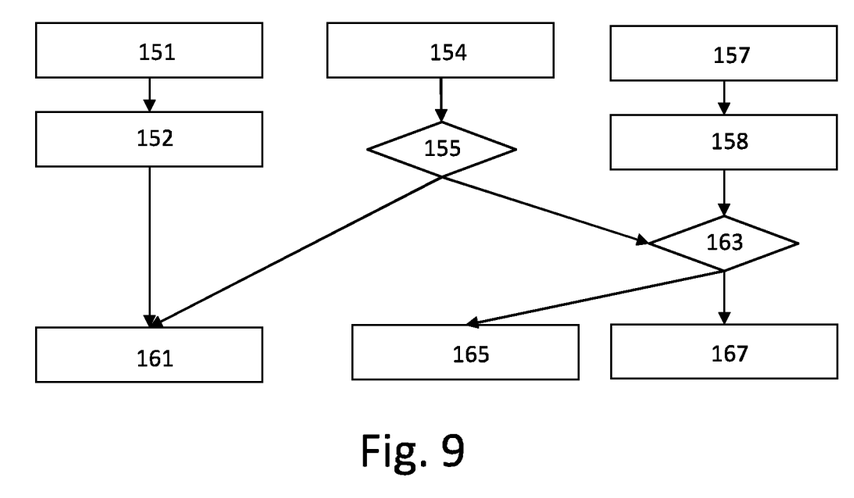
FIG. 9 is a flow diagram of a first embodiment of a method of automatically activating and deactivating a privacy mode.

FIG. 9 shows a first embodiment of a method of automatically activating and deactivating a privacy mode. A privacy mode may relate to a single device or to multiple devices. A privacy mode may relate to one or more specified devices or to all devices in a location, e.g. home. In the embodiment of FIG. 9, each device can be set into privacy mode individually. In the embodiment of FIG. 9, a privacy mode is automatically activated if a scene associated with the privacy mode is selected or a certain timer (of a user-specified schedule) expires. In the embodiment of FIG. 9, a privacy mode is automatically deactivated if a scene not associated with any privacy mode is selected or a certain other timer (of the user-specified schedule) expires.

A step 151 comprises manual or automatic selection of a first scene, which is associated with one or more lighting devices and with a privacy mode for these one or more lighting devices. Step 152 comprises rendering this first scene on these on or more lighting devices. Step 161 is performed after step 152 and comprises activating the privacy mode for these one or more lighting devices if the privacy mode is not already active for these one or more lighting devices. Step 161 further comprises recording the reason for activating the privacy mode, e.g. by identifying the scene which has been selected in step 151.

A step 157 comprises manual or automatic selection of a second scene, which is associated with the same one or more lighting devices, but is not associated with the privacy mode. Step 158 comprises rendering this second scene on these on or more lighting devices. Step 163 is performed after step 158. Step 163 comprises checking whether the privacy mode is active and if so, whether selection of the first scene was the only reason for activating the privacy mode.

If the privacy mode is not active, then no further step is performed. If the privacy mode is active and selection of the first scene was the only reason for activating the privacy mode, then step 167 is performed. Step 167 comprises deactivating the privacy mode and removing the recorded reason for activating the privacy mode. If the privacy mode is active and selection of the first scene was not the only reason for activating the privacy mode, then step 165 is performed. Step 165 comprises removing selection of the first scene as recorded reason for automatically activating the privacy mode. Another reason for automatically activating the privacy mode may then still remain recorded, e.g. a timer of the user-specified schedule expiring.

A step 154 comprises a timer of the user-specified time schedule expiring. A step 155 comprises determining whether the expired timer corresponds to the start or end of a privacy time window. If the timer corresponds to the start of a privacy time window, step 161 is performed. If the timer corresponds to the end of a privacy time window, step 163 is performed. In an alternative embodiment, steps 154 and 155 or steps 151, 152, 157, and 158 are omitted.

Figure 10:
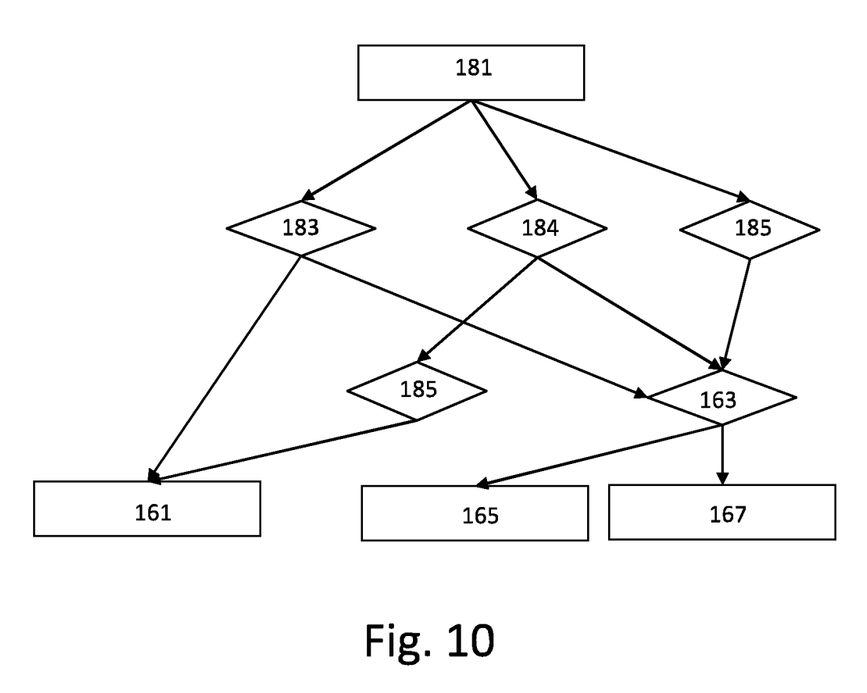
FIG. 10 is a flow diagram of a second embodiment of the method of automatically activating and deactivating a privacy mode.

FIG. 10 shows a second embodiment of a method of automatically activating and deactivating a privacy mode. In the embodiment of FIG. 10, the privacy mode is automatically activated upon detection of the presence of one or more specified persons and/or the absence of one or more specified persons.

A step 181 comprises identifying which persons are present. Identification of persons may be performed using cameras, for example. Alternatively, persons may be identified based on RF (e.g. Bluetooth or Wi-Fi) transmissions by their user devices.

A step 183 comprises checking whether a person from group X is present. If such a person's presence is detected, then step 161 is performed and a privacy mode associated with this event is activated for the one or more devices associated with the privacy mode, if not already activated. If such a person's presence is not detected, then step 163 is performed and the privacy mode is deactivated if this person's presence was the only reason for activating the privacy mode.

A step 184 comprises checking whether a person from group Y is present. If such a person's presence is not detected, then step 163 is performed and the privacy mode is deactivated if this person's presence (in combination with the presence of a person from group Z) was the only reason for activating the privacy mode. If such a person's presence is detected, then a step 185 is performed.

Step 185 comprises checking whether a person from group Z who is associated with the detected person from group Y is also present. If such a person's presence is not detected, i.e. this person is detected to be absent, then step 161 is performed and a privacy mode associated with this event is activated for the one or more devices associated with the privacy mode, if not already activated. If such a person's presence is detected in step 185, then no further step is performed.

Step 185 is also performed after step 181. If a person from group Z is determined to be present, then step 163 is performed and the privacy mode is deactivated if this person's absence (in combination with the presence of a person from group Y) was the only reason for activating the privacy mode. A person can be in both group Y and group Z, but not in both group X and group Y or in both group X and group Z.

In an example application, two users both have a control app for controlling lighting devices in their home and the first user may be able to specify that the privacy mode is automatically activated when the first user (from group Y) is detected and the second user (from group Z) is not detected and automatically deactivated again when either the first user is no longer detected or the second user is detected. In an alternative embodiment, the steps of FIGS. 9 and 10 are combined.

Figure 11:
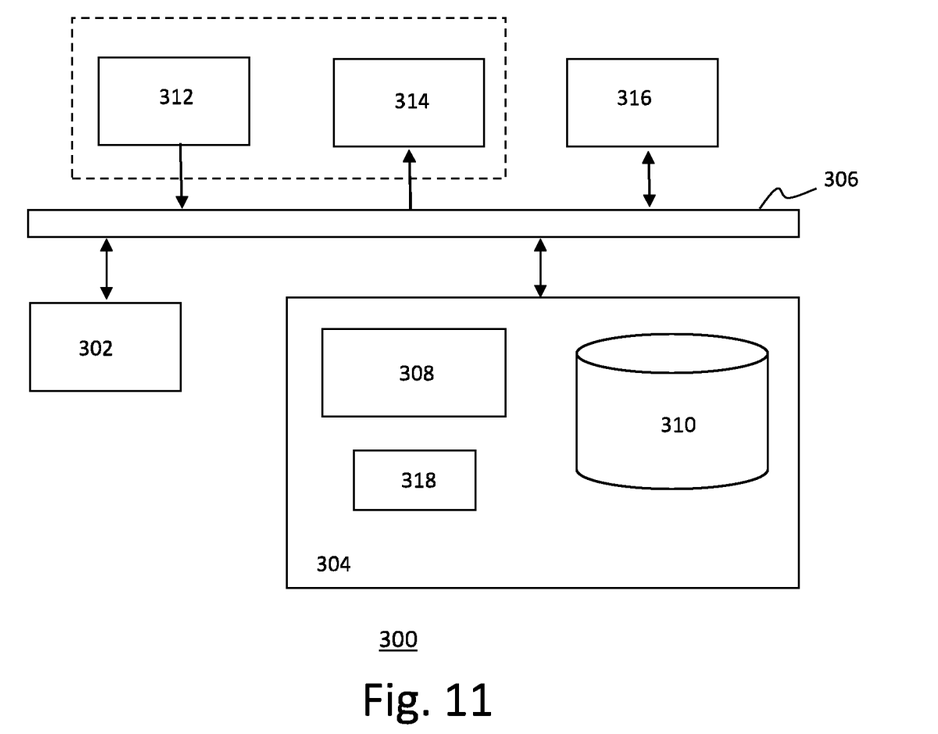
FIG. 11 is a block diagram of an exemplary data processing system for performing the method of the invention.

FIG. 11 depicts a block diagram illustrating an exemplary data processing system that may perform the method as described with reference to FIGS. 4, 5, 7, 9 and 10.

As shown in FIG. 11, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display. A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 11, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 11) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 11 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for receiving status information reflecting a current status of a device and causing first status information to be presented on a first user device and second status information to be presented on a second user device, wherein the device is a lighting device, the system comprising:
    at least one input interface;
    at least one output interface; and
    at least one processor configured to:
        use said at least one input interface to receive said status information reflecting said current status of said device,
        determine said first status information for presentation on said first user device, said first status information reflecting said current status of said device,
        use said at least one output interface to cause said first status information to be presented on said first user device, and
        use said at least one output interface to cause said second status information to be presented on said second user device, said second status information reflecting said current status of said device in dependence on whether a privacy mode is active for said device,
wherein said at least one processor is configured to determine a fictitious current status for said device and include said fictitious current status in said second status information when said privacy mode is active for said device.

2. A system as claimed in claim 1, wherein said at least one processor is configured to:
    use said at least one output interface to transmit said first status information to said first user device,
    determine said second status information, and
    use said at least one output interface to transmit said second status information to said second user device.

3. A system as claimed in claim 1, wherein said at least one processor is configured to:
    use said at least one input interface to receive a control command for controlling said device, and
    use said at least one output interface to control said device according to said control command in dependence on whether said privacy mode is active for said device.

4. A system as claimed in claim 1, wherein said at least one processor is configured to determine said second status information such that said second status information does not reflect said current status or a fictitious status of said device and indicates that said privacy mode is active for said device upon determining that said privacy mode is active for said device.

5. A system as claimed in claim 4, wherein said at least one processor is configured to determine said second status information such that said second status information identifies a user who activated said privacy mode and/or a user device on which said privacy mode was activated.

6. A system as claimed in claim 1, wherein said fictitious current status is a last known status of said device before said privacy mode was activated for said device, said fictitious current status has been randomly determined or said fictitious current status has been determined based on a plurality of previous statuses of said device.

7. A system as claimed in claim 1, wherein said privacy mode was activated on said first user device by a user of said first user device.

8. A system as claimed in claim 1, wherein the system comprises said first user device and said second user device, wherein said first user device is connected to the same local network as said device and said second user device is connected to a different local network than said device.

9. A system as claimed in claim 1, wherein the system comprises said first user device and said second user device, wherein said first user device is used by a user identified in first user information associated with said privacy mode and/or said second user device is used by a user identified in second user information associated with said privacy mode.

10. A system as claimed in claim 1, wherein said privacy mode is automatically activated upon selection of a first light scene associated with said privacy mode or upon use of a first light control means associated with said privacy mode and/or automatically deactivated upon selection of a second light scene not associated with said privacy mode or upon use of a second light control means not associated with said privacy mode.

11. A system as claimed in claim 1, wherein said privacy mode is automatically activated or deactivated upon detection of the presence of one or more specified persons and/or the absence of the one or more specified persons and/or based on a user-specified schedule.

12. A system as claimed in claim 1, wherein said status comprises at least one of a current on/off setting, a current light output level and a current color setting.

13. A method of receiving status information reflecting a current status of a device and causing first status information to be presented on a first user device and second status information to be presented on a second user device, wherein the device is a lighting device, the method comprising:

receiving said status information reflecting said current status of said device;

determining said first status information for presentation on said first user device, said first status information reflecting said current status of said device;

determining a fictitious current status for said device and include said fictitious current status in said second status information when a privacy mode is active for said device;

causing said first status information to be presented on said first user device; and causing said second status information to be presented on said second user device, said second status information reflecting said fictitious current status when said privacy mode is active for said device.

14. A non-transitory computer program product comprising at least one software code portion, the software code portion, when run on a computer system, being configured for performing a method of receiving status information reflecting a current status of a device and causing first status information to be presented on a first user device and second status information to be presented on a second user device, wherein the device is a lighting device, the method comprising:

receiving said status information reflecting said current status of said device;

determining said first status information for presentation on said first user device, said first status information reflecting said current status of said device;

determining a fictitious current status for said device and include said fictitious current status in said second status information when a privacy mode is active for said device;

causing said first status information to be presented on said first user device; and causing said second status information to be presented on said second user device, said second status information reflecting said fictitious current status when said privacy mode is active for said device.

* * * * *